United States Patent [19]

Kovaleski

[11] Patent Number: 5,226,555
[45] Date of Patent: Jul. 13, 1993

[54] BATTERY CONTAINER

[75] Inventor: Richard A. Kovaleski, Nashport, Ohio

[73] Assignee: Greif Bros. Corporation, Delaware, Ohio

[21] Appl. No.: 922,797

[22] Filed: Jul. 31, 1992

[51] Int. Cl.$^5$ .......................... B65D 5/60; B65D 85/84
[52] U.S. Cl. ..................................... 220/403; 206/333; 206/521; 220/410; 229/23 R
[58] Field of Search ...................... 229/23 R, 23 A, 40; 206/333, 521, 523; 220/400, 403, 408, 410

[56] References Cited

U.S. PATENT DOCUMENTS

| | | |
|---|---|---|
| Re. 19,181 | 4/1928 | Boeye . |
| 1,240,239 | 9/1917 | Moffett ................................ 206/333 |
| 1,882,565 | 8/1930 | Boeye . |
| 1,965,215 | 3/1933 | Boeye . |
| 2,479,453 | 8/1949 | Amatel . |
| 2,536,442 | 1/1951 | Guyer ................................ 229/23 R |
| 2,671,599 | 3/1954 | Price ................................... 220/416 |
| 2,707,721 | 5/1955 | Anderson et al. .................. 206/333 |
| 2,713,964 | 7/1955 | Repking et al. . |
| 2,836,338 | 5/1958 | Daniels . |
| 3,146,132 | 8/1964 | Nathan ................................ 206/333 |
| 3,372,796 | 3/1968 | Foote et al. . |
| 3,483,041 | 12/1969 | Kalen . |
| 3,741,815 | 6/1973 | Peterson . |
| 3,765,527 | 10/1973 | Vargo . |
| 3,890,762 | 6/1975 | Ernst et al. ......................... 220/400 |
| 4,027,794 | 6/1977 | Olson . |
| 4,696,402 | 9/1987 | Harmon et al. . |
| 4,978,028 | 12/1990 | George et al. ..................... 220/403 |
| 5,009,326 | 4/1991 | Reaves et al. ..................... 220/410 |
| 5,098,757 | 3/1992 | Steel . |
| 5,102,004 | 4/1992 | Hollander et al. ................. 220/408 |
| 5,160,025 | 11/1992 | Greenawald ....................... 206/333 |

FOREIGN PATENT DOCUMENTS

| | | | |
|---|---|---|---|
| 2483893 | 12/1981 | France ................................ 220/403 |
| 2062583 | 5/1981 | United Kingdom .................. 229/40 |

Primary Examiner—Gary E. Elkins
Attorney, Agent, or Firm—Kane, Dalsimer, Sullivan, Kurucz, Levy, Eisele and Richard

[57] ABSTRACT

A battery container for transportation and storage of wet-acid batteries includes an inner liner for holding a battery, an outer liner wrapped around the inner liner and an enclosure wrapped around both liners. The inner liner absorbs liquids spilled from the battery while the outer liner and enclosure cooperate to absorb G-forces when the container is dropped, to protect the battery from shock.

14 Claims, 4 Drawing Sheets

BATTERY CONTAINER

BACKGROUND OF THE INVENTION

1. Field of Invention

This invention pertains to a battery container, and more particularly for a container for the storage and transportation of wet-acid batteries safely and securely, in accordance with current international regulations.

2. Description of the Prior Art

Wet-acid batteries are filled with corrosive acid and hence are considered to contain hazardous materials. Therefore containers for shipping such batteries must meet certain requirement set by international authorities including for example performance tests set by the United Nations. While the prior art is replete with cardboard boxes, none of them to the knowledge of the inventor are rugged enough to withstand the international regulations.

OBJECTIVES AND SUMMARY OF THE INVENTION

In view of the above disadvantages of the prior art, it is an objective to provide a battery container rugged enough to withstand rough handling thereby insuring the safe shipping and storing of wet-acid batteries.

Another objective is to provide a container made of commonly available materials thereby reducing their overall cost of manufacture.

Yet another objective is to provide a relatively light yet strong box for batteries to reduce overall shipping costs.

Other objectives and advantages of the invention shall become apparent from the following description of the invention. Briefly a battery container constructed in accordance with this invention contains several components including an inner liner for absorbing liquids spilled from the container, an outer liner, and an outer shell made of relatively heavy cardboard. The shell and outer liner cooperate to protect the battery from shock when the container is handled roughly or dropped.

BRIEF DESCRIPTION OF THE INVENTION

DETAILED DESCRIPTION OF THE INVENTION

Figure 1:
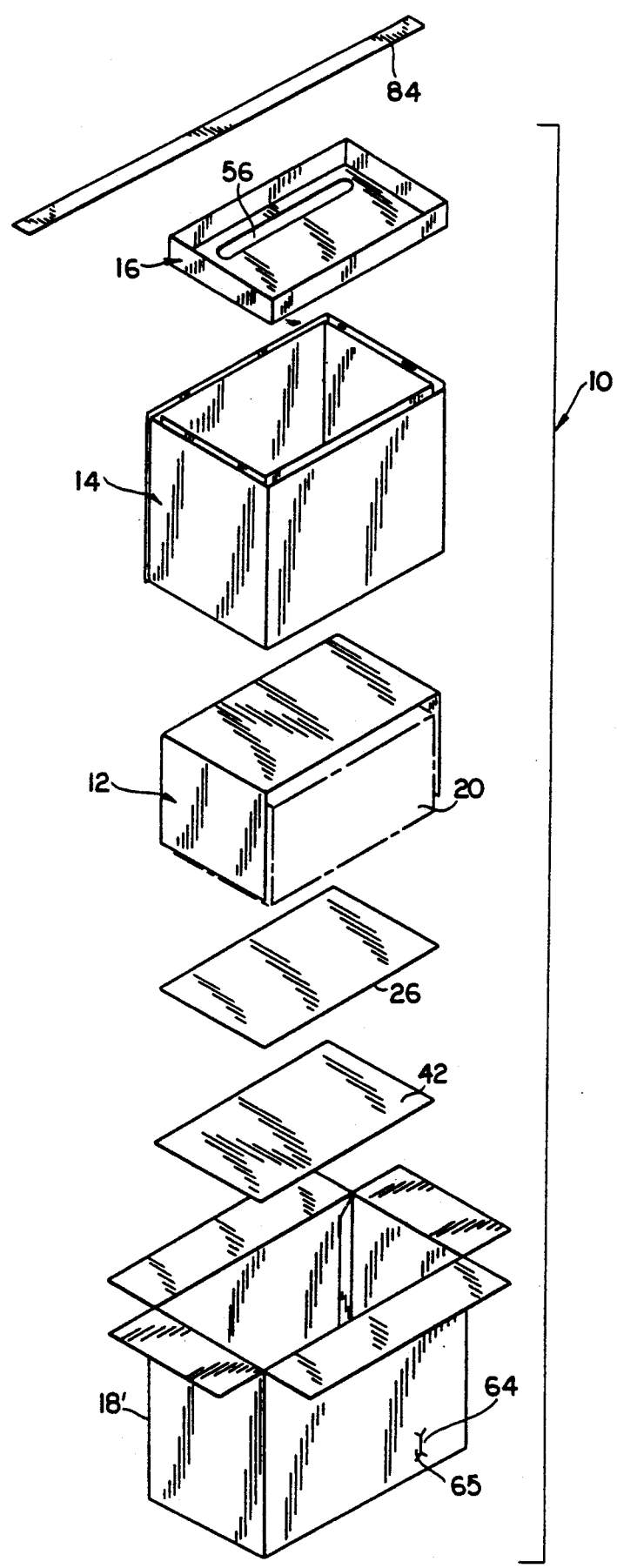
FIG. 1 shows an exploded view of a battery container constructed in accordance with this invention.

Referring now to the drawings, a battery container 10 constructed in accordance with this invention consists of several elements including an inner liner assembly and an outer liner assembly all arranged around a battery 20 and nested in an enclosure 18'.

Figure 4:
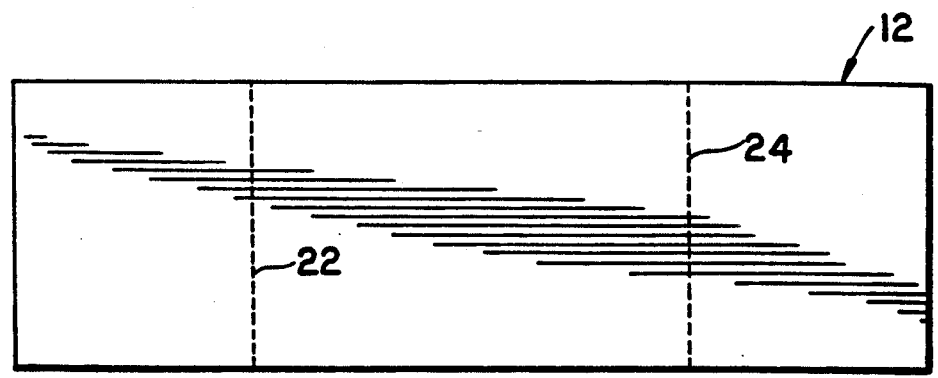
FIG. 4 shows a development of the inner liner for the container of FIG. 1.
Figure 3:
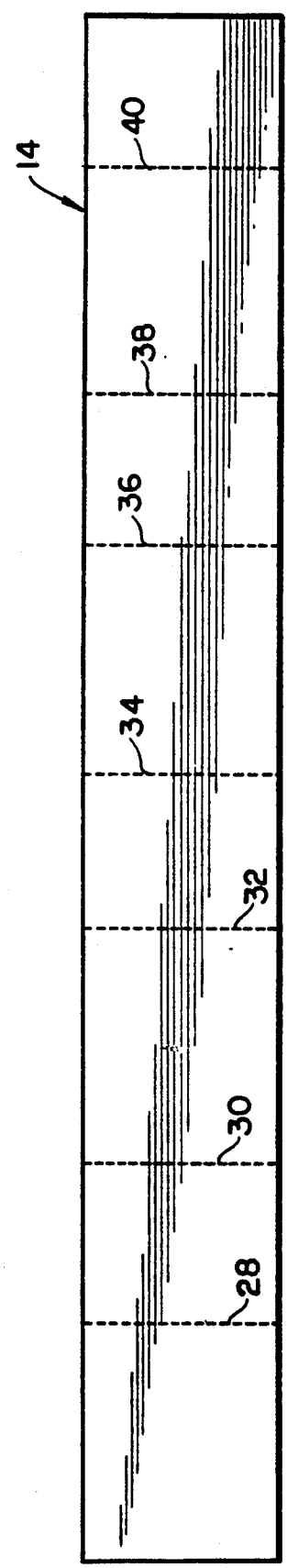
FIG. 3 shows a development of the outer liner for the container of FIG. 1.

The inner liner assembly includes an inner liner panel 12 shown in FIG. 4 which is made from a single rectangular sheet of tissue wading. Inner liner panel 12 is folded along lines 22, 24 and disposed on the top, and two sides of the battery 20.

Under battery 20 there is a liner pad 26 made of the same tissue wading material as inner liner panel 12. Thus, inner liner pad 26 and inner liner panel 12 cooperate to form an inner liner assembly disposed around battery 20. This inner liner assembly protects the battery 20 from minor shocks and absorbs acid spilled therefrom.

Figure 2:
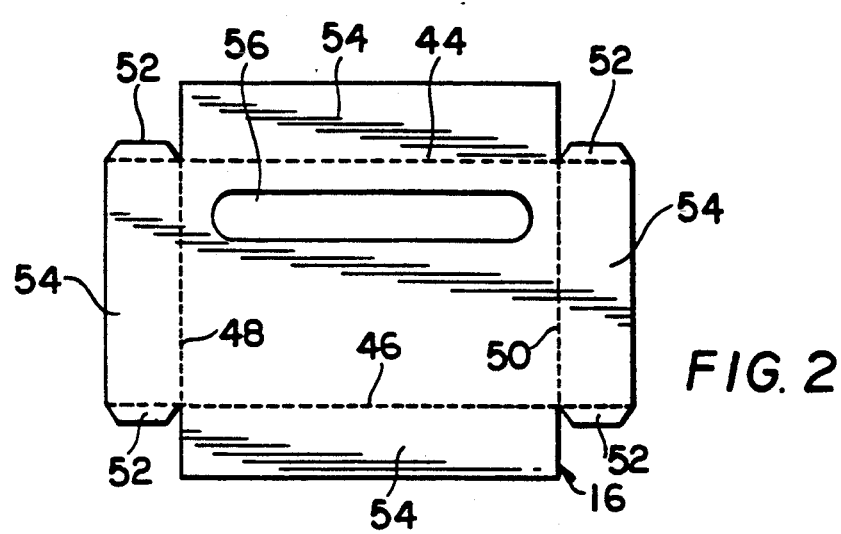
FIG. 2 shows a development of the tray for the container of FIG. 1.

Next a sheet of heavy 500 weight cardboard panel 14 is folded along score lines 28-40 to form a four sided doublewalled rectangular body 14'. Body 14' is disposed around the inner liner assembly and battery 20. Under inner liner pad 26 there is an outer liner pad 42 made of the same heavy weight material as sheet 14. In addition, a cardboard sheet 16 having a 275 weight is die cut to the shape shown in FIG. 2. This sheet is then folded along score lines 44-53 and its side panels 52 are glued to side walls 54 to form tray 16'. Tray 16' is provided with a cutout in the shape of an elongated oval hole 56. Body 14, tray 16' and pad 42 cooperate to form an outer liner for the battery. This outer liner is provided to absorb the G-forces when the container is dropped form a height. In addition, the outer liner also absorbs acid spilled from the battery 20. Finally, the tray 16' further provides an air cell within the container 10 for accumulating gases vented from the battery, thereby reducing the chance of the container exploding.

Figure 5:
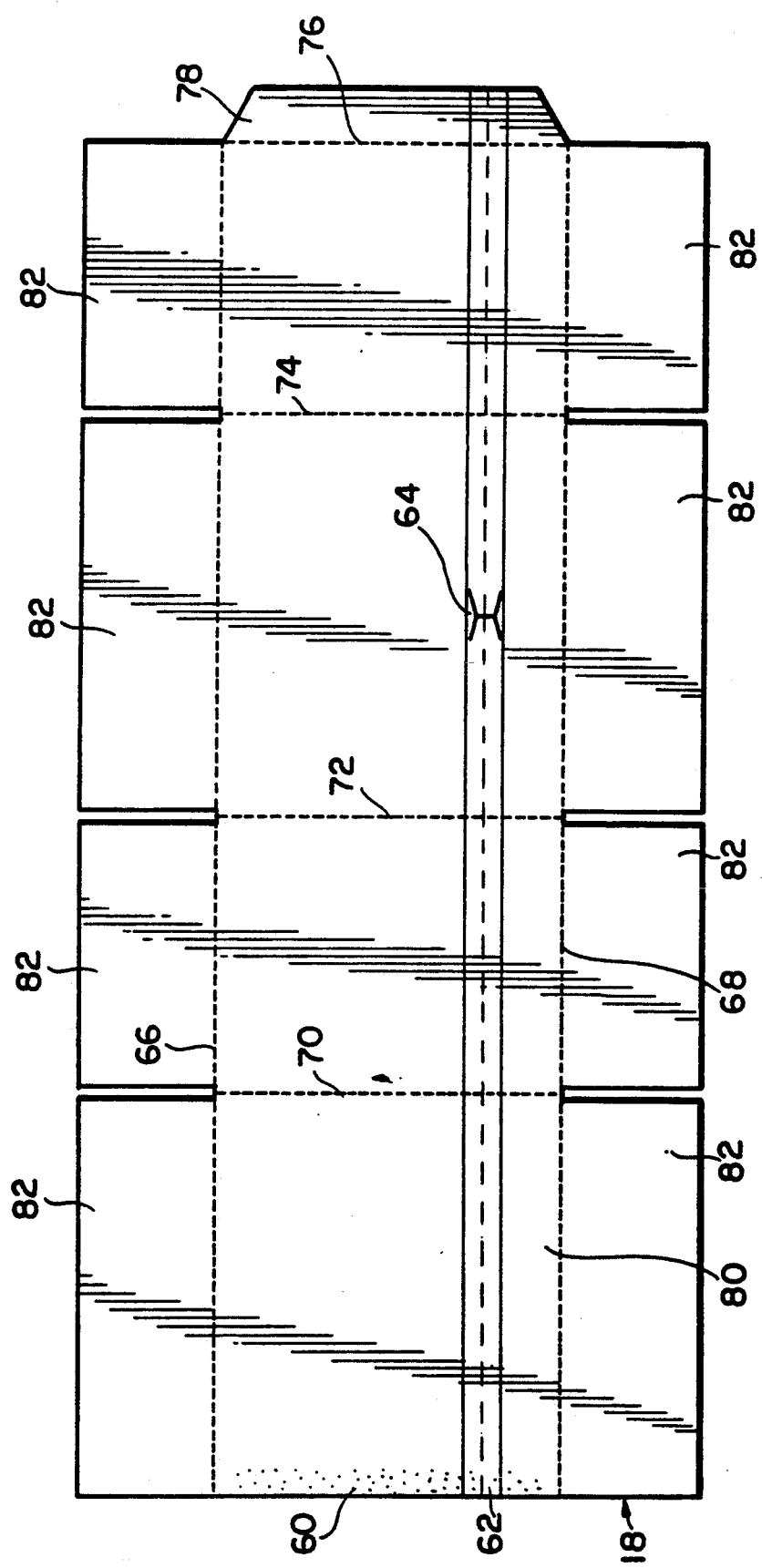
FIG. 5 shows a development of the enclosure for the container of FIG. 1.

Finally, enclosure 18' is formed from a heavy duty 500 weight cardboard die to form the sheet 18 shown in FIG. 5. This sheet 18 is provided on its inner surface 60 with a coating designed to repel acid from battery 20. This coating may be for example a material sold under the name of coating X-300 TM by Michelman, Inc., 9089 Shell Road, Cincinnati, Ohio 45236-1299.

Sheet 18 is also provided on in inner surface with a tear tape 62 disposed longitudinally on the sheet. Such a tape is available for example under the name OPEN-SESAME TM from the H. B. Fuller Company, Linear Products Division, 417 N.W. 136th Street, Vancouver, Wash. 98685. An H-shaped cut 64 is made in the sheet 18 to form a tab 65 on the tape 62.

Sheet 18 is folded along score lines 66-76 and side panel 78 is glued to panel 80 to form the enclosure 18' of FIG. 1. The enclosure also protects the battery from G-forces on impact and it resists tears during rough handling.

As shown in FIG. 64 the inner liner assembly, and outer assembly all are sized and constructed to fit snugly inside enclosure 18' around battery 20. Once the battery 20, inner liner assembly, and outer liner assembly are inserted into enclosure 18', the box flaps 82 of the enclosure 18' are closed and taped down using a box flaps sealing tape 84. Preferably, this tape is also acid proof. This tape is available form the 3M Company under the designation (3M#355). It should be understood that only a small amount of the tape 84 is shown in FIG. 1 for the sake of clarity. In practice this tape is used to cover all the open edges of the container.

In this manner a strong shock resistant spill proof container is obtained for the battery which can be transported using common carriers. Once the battery container 10 reaches its intended destination, enclosure 18' is easily opened by pulling on tab 65, thereby tearing enclosure 64 all around along tape 62.

Obviously numerous modifications may be made to this invention without departing from its scope as defined in the appended claims.

I claim:

1. An acid battery container comprising:

an inner liner sized and shaped for holding a wet acid battery, said liner being made of a material selected for absorbing liquids spiller from said battery;

an outer liner disposed around said inner liner; and an enclosure means disposed around said outer liner cooperating with said outer liner for protecting said battery against shock when said container is dropped, said outer liner including an outer liner means defining a space for accumulating gases from said battery.

2. The container of claim 1 wherein said inner liner consists of a single layer of tissue wading.

3. The container of claim 1 wherein said enclosure means has an inner surface coated with a liquid repellant material.

4. The container of claim 1 wherein said outer liner includes a double layer wall.

5. A wet-acid battery container comprising:

an inner liner including an inner liner panel arranged and constructed to at least partially surround a wet-acid battery said inner liner being made of a material selected for absorbing liquids spilled from said battery;

an outer liner including an outer wall panel arranged about said inner liner, said outer liner panel being made of a heavy cardboard to absorb G forces when said container is dropped; and an enclosure surrounding said outer liner.

6. The container of claim 5 wherein said inner liner panel has three sides and said inner liner further comprises an inner liner sheet adapted to be disposed under said battery.

7. The container of claim 5 wherein said outer liner panel comprises a single sheet of cardboard wrapped about said inner liner to form a double wall.

8. The container of claim 7 wherein said outer liner further comprises an outer liner sheet adapted to be disposed under said battery.

9. The container of claim 7 wherein said outer liner comprises an outer liner member adapted to be disposed on top of said battery.

10. The container of claim 9 wherein said outer defines a space for collecting gases from said battery.

11. The container of claim 5 wherein said enclosure consists of a single enclosure panel of cardboard folded to enclose said inner and outer liners.

12. The container of claim 11 wherein said enclosure panel has an inner surface coated with a liquid repellant material.

13. The container of claim 11 wherein said enclosure panel has an inner surface with a longitudinal tear string for opening said enclosure.

14. The container of claim 11 wherein said enclosure panel is closed by a liquid repellant tape applied to said enclosure panel.

* * * * *